Patented May 8, 1934

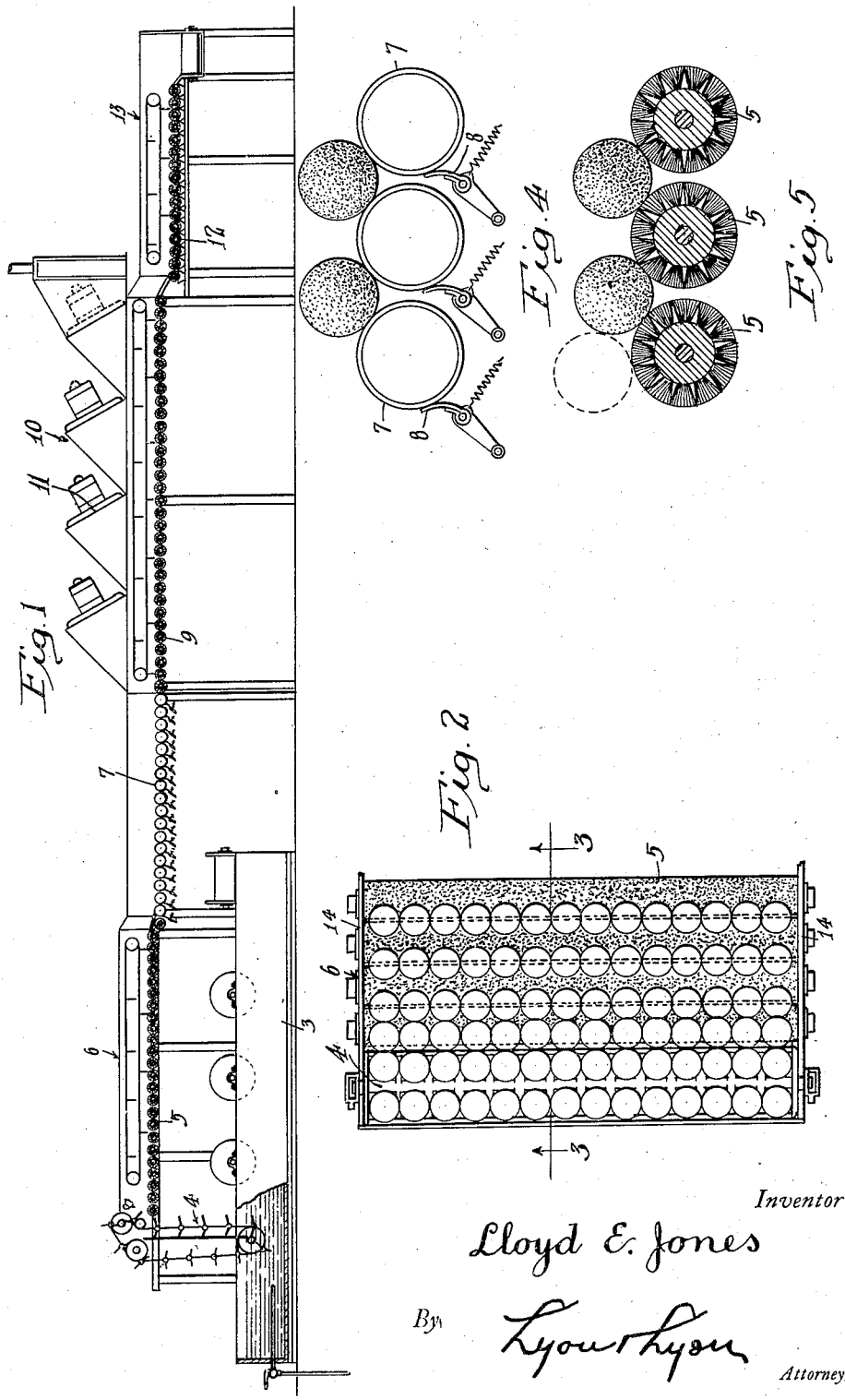

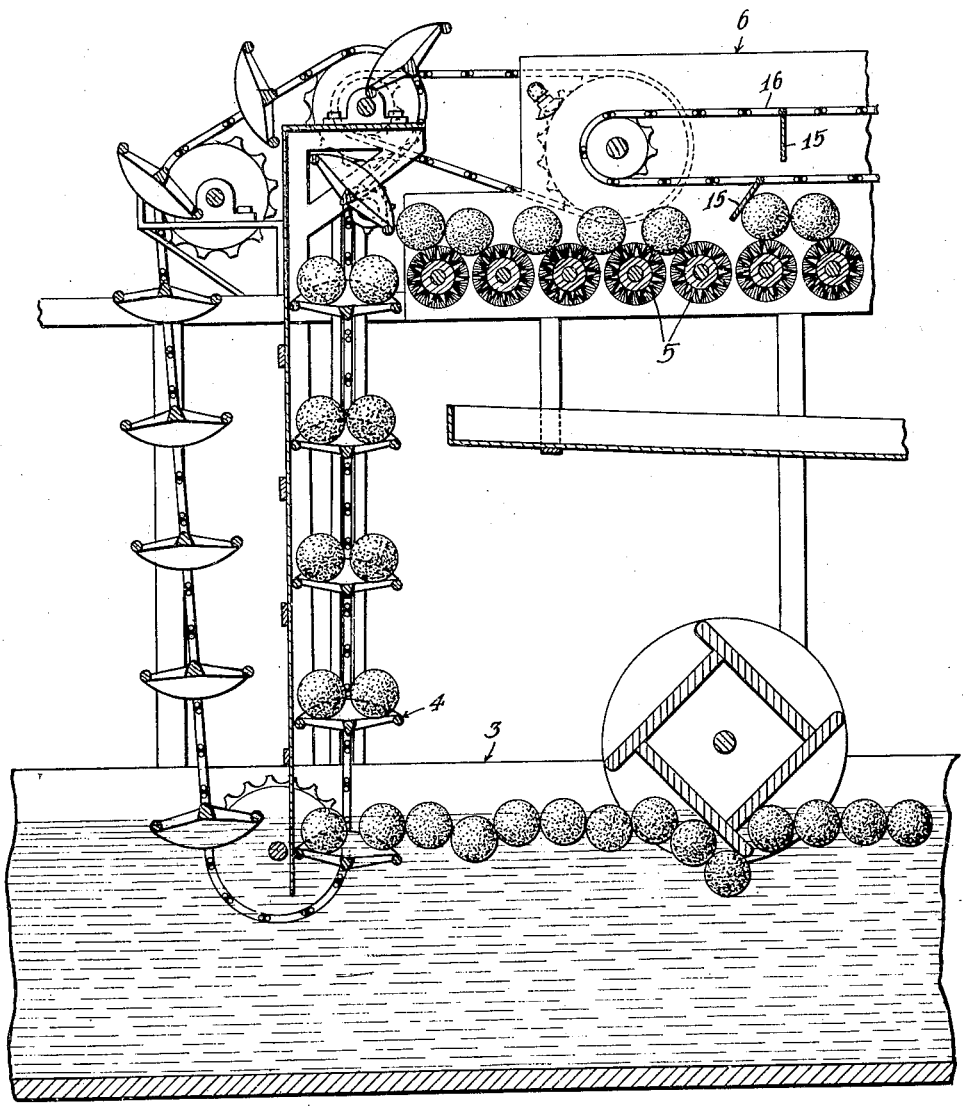

1,957,964

UNITED STATES PATENT OFFICE 1,957,964

METHOD AND APPARATUS FOR TREATING FRUIT AND THE LIKE

Lloyd E. Jones, Pasadena, Calif., assignor to Food Machinery Corporation, San Jose, Calif., a corporation of Delaware Application April 26, 1932, Serial No. 607,577

19 Claims. (Cl. 146—202)

This invention relates to a method and apparatus for treating fruit and the like and is particularly adapted for use in connection with the treatment of such fruit as oranges, lemons, grape fruit, apples, and so forth.

In the preparation of fresh fruit for market, such as oranges, for example, it is the customary practice to subject the fruit to a series of treating operations, including washing the fruit to cleanse the same, thereafter drying the fruit, and subsequently polishing the same. While being so treated, the fruit is customarily passed over a conveyor, and this invention has reference particularly to controlling the passage of the fruit along such conveyor where the conveyor is formed by a plurality of rotating supporting elements arranged transverse to the path of the fruit. Heretofore such conveyors have been built so that the fruit will be caused to individually pass along the conveyor by the rotation of the supporting elements, or by the action of propelling elements such as pushers, paddle wheels, and so forth. I have discovered that the rotating supporting elements of the conveyor may be formed of such size relative to the fruit that, when rotated at required speeds and properly spaced apart, the fruit will normally remain between the supporting elements, with sufficient traction to provide the necessary treating contact with the supporting elements, and not pass thereover, and that the fruit may be caused to flow along the conveyor by the feeding of additional fruit thereto. In this manner, I have found that I can control the time of treatment of the fruit by controlling the rate of feed of fruit to the conveyor. Such control has been found in actual practice to be highly advantageous because of its simplicity and the ease with which it enables the time of treatment of the fruit to be closely regulated.

The object of the invention is the provision of a method and apparatus whereby the flow of fruit or the like during treatment may be controlled by the rate at which the fruit is fed for treatment. More specifically, it is the object of this invention to provide for the treatment of fruit by a conveyor comprising parallel rotating conveying elements arranged transverse to the path of the fruit of such size and so spaced that the traction of the fruit on the supporting elements is sufficient to provide the necessary treating action, and not sufficient to cause the fruit to flow along the conveyor except as displaced by the feed of additional fruit onto the same. These and other objects and advantages of the invention will become apparent by reference to the accompanying drawings, illustrating one form in which the same has been put to practical use, in which:

Fig. 1 is a diagram of a line of equipment embodying the present invention that has been successfully employed commercially for treating and preparing citrus fruit for the market.

Fig. 2 is a top plan view illustrating the feeding of fruit from the elevator to the conveyor in Fig. 1 across the full width of the conveyor.

Fig. 3 is a vertical section taken on the line indicated by 3—3 in Fig. 2.

Fig. 4 is a detail of the smooth metal rollers forming the conveyor in one portion of Fig. 1.

Fig. 5 is a detail of the brushes forming the conveyor in another portion of Fig. 1.

Referring to Fig. 1 of the drawings, the fresh fruit from the orchard is immersed in a soaking tank 3 and is passed therefrom by the elevator 4 onto the parallel rotating vegetable fiber brushes 5 arranged transverse to the path of the fruit to form a conveyor through the washer 6. During the progress of the fruit through the washer 6, the fruit is sprinkled with water and gently and thoroughly cleaned by contact with the brushes 5. The wet fruit is discharged from the washer 6 onto a series of smooth metal rotating rollers 7 which function to eliminate water from the surface of the fruit. This is accomplished by the contact of the fruit with the metal rollers transferring water from the fruit to the surface of the metal rollers, which water is wiped from the rollers by soft-rubber wipers 8 (see Fig. 4). The metal rollers 7 are arranged transverse to the path of the fruit to form a conveyor by which the fruit is passed from the washer 6 to the series of rotating parallel horse-hair brushes 9 arranged transverse to the path of the fruit to form a conveyor through a drier 10. The contact of the fruit with the brushes 9 acts on the remaining moisture adhering to the surface of the fruit, where it is exposed to blasts of air from blowers 11 to complete the drying of the fruit.

The completely dried fruit is discharged from the drier 10 onto the parallel rotating horse-hair brushes 12 likewise arranged transverse to the path of the fruit to form a conveyor through a polisher 13. In the polisher 13 the brushes 12 act on the fruit to polish the same, and for that purpose wax may be applied to the brushes 12 as well understood in this art. The polished fruit is discharged from the polisher 13 and is then ready for grading and wrapping.

The performance of each of the several treating functions above described is dependent upon the fruit having a proper traction upon the brushes or rollers and the proper length and speed of peripheral contact between the fruit and brushes or rollers. The amount of traction of the fruit on the brushes or rollers depends on the relative size or diameter of the fruit to that of the rollers or brushes and the spacing between the brushes or rollers. I have determined that by the selection of a roller or brush of a proper relative diameter to the diameter of the fruit and the proper spacing between the brushes or rollers, such a traction may be imparted to the fruit on the brushes or rollers that the fruit will normally remain between the brushes for proper treating action without passing over the brushes and yet will be caused to pass over the brushes and flow along the conveyor by additional fruit fed onto the brushes.

In this manner, I am able to control the time or extent of the treating action by merely the volume of fruit fed to the brushes.

Referring, for example, to the respective treating functions referred to above, I accomplish the proper washing for oranges having the usual average diameter of three inches by brushes having a diameter of four and a half inches, spaced apart to give approximately a clearance of one-half inch between brushes with the brushes rotated at 100 to 275 R. P. M. For the elimination of water from the surface of the washed fruit by means of the smooth metal rollers, I employ rollers of the same diameter as the diameter of the brushes last referred to, but with the clearance between the rollers reduced from one-half inch to one-quarter inch and with the metal rollers rotated at a speed ranging between 50 to 60 R. P. M. The brushes in the drier and polisher may be of the same relative diameter, spaced the same and rotated at the same speed as the brushes in the washer.

It will be understood that these specific examples are stated for purposes of illustration only. For fruit of any diameter, a brush or roller of proper relative diameter may be selected and spaced and rotated at a speed so that the fruit will have the necessary traction to accomplish the desired treating and at the same time leave the flow of the fruit to be controlled by the volume fed, in accordance with the principle of this invention as illustrated by the foregoing examples.

The invention may be practiced for a single treatment, but is adapted for use throughout a succession of treatments as illustrated by the complete equipment line illustrated diagrammatically in Fig. 1, in which case it has the added advantage of providing a uniform flow of fruit throughout the line controlled merely by the volume of fruit fed at the intake to the line.

The invention may be employed with the conveyor formed by the brushes or rollers placed horizontally or somewhat inclined upwardly or downwardly by taking into account any variation in pitch in determining the proper ratio of the diameter of the fruit to the brushes or rollers, the spacing of the same apart and the speed of rotation. For example, in the equipment illustrated in Fig. 1, the brushes in the washer, drier and polisher are arranged horizontally, whereas the metal rollers are pitched downwardly at the rate of three-quarters of an inch per foot.

I have observed that, when the washer 6 illustrated in the accompanying drawings is empty of fruit and fruit is fed onto the brushes 5 from the elevator 4, the fruit first fills the first valley between the brushes adjacent the elevator 4 before any fruit passes into the succeeding valley, and that this action continues throughout the equipment. When a valley formed between adjacent brushes or rollers has been filled from side to side, the next fruit will cause the particular piece or pieces of fruit which it contacts to move forward into the valley between the next succeeding brushes. Side rails or walls 14 are provided at the end of the brushes or rollers to prevent lateral displacement of the fruit when the valley between adjacent brushes or rollers is filled. If the fruit is fed in small volume and not uniformly across the full width of the conveyor, there is a tendency to channel, with the result that there may not be a uniform flow of all of the fruit under treatment, particularly adjacent the feed end of the conveyor. To avoid this, I prefer that the fruit be fed to the conveyor uniformly across the entire width of the brushes or rollers. This may be accomplished as illustrated in Fig. 2 by presenting the fruit to the brushes uniformly across the entire width of the brushes by means of the elevator 4.

The invention may be supplemented by additional means to cause the fruit to flow along the conveyor, for example, to clear the conveyor of fruit after the feeding has stopped. Such additional means are illustrated particularly in Fig. 3 in the form of a clean-out comprising yieldable flights 15 propelled by an endless conveyor 16. I prefer to operate this clean-out mechanism at a speed correspondingly less than the normal flow of the fruit along the conveyor under the control of the fruit fed to the conveyor, and as the flaps 15 will yield to permit the passage of the fruit by the flaps, the latter do not interfere with the normal operation. The clean-out is intended primarily to remove fruit from the conveyor after the feed has stopped and to assure that no fruit remains between the brushes or rollers for an abnormal period of treatment if the feed of fruit to the conveyor is irregular or interrupted.

This application is a continuation in part of my co-pending application, Serial Number 367,667, filed June 1, 1929.

Having described and illustrated the principle of my invention by means of the foregoing illustrations, it is to be understood that the same is not limited to the details of the examples given, but is of the scope defined in the following claims.

I claim:

1. The method of controlling the volume flow of fruit consisting in establishing a series of restricted parallel paths and moving fruit from path to path, consisting in feeding fruit into one of said paths, subjecting the fruit in the path to a limited amount of supporting traction sufficient to rotate the fruit for treating purposes but insufficient to transfer it from path to path, continuing the feeding of fruit to said path until it is filled, then feeding additional fruit to said path to displace fruit therein and cause it to move to the next adjacent path.

2. The method of controlling the volume flow of fruit consisting in establishing a restricted area of treating grooves for the treatment of fruit, feeding fruit thereto, subjecting the fruit in said area to a limited amount of supporting traction to rotate the fruit for treating purposes but insufficient to move it out of said treating grooves, feeding fruit to said area until it is filled, the feeding of additional fruit providing additional traction to the fruit to cause it to move transversely from groove to groove.

3. The method of controlling the volume flow of fruit through treating grooves arranged transversely to the travel of the fruit consisting in filling said grooves with fruit, subjecting the fruit in said grooves to a limited amount of supporting traction to rotate the fruit for treating purposes but insufficient to move the fruit from said grooves, subjecting fruit in the grooves to an outside force to provide additional tractive effect to cause the fruit to move transversely from groove to groove.

4. The method of controlling the volume flow of fruit consisting in establishing a restricted area comprising a series of paths, feeding fruit to the area transverse to said paths and moving fruit from path to path, subjecting the fruit in the paths to a limited amount of supporting traction sufficient to rotate the fruit for treating purposes but insufficient to transfer it to adjacent paths, continuing the feeding of fruit to the paths after they are filled to provide additional traction to the fruit to cause it to move to adjacent paths, the feeding of such additional fruit causing an equal volume of fruit, to that fed thereto, to move to adjacent paths.

5. The method of controlling the volume flow of fruit through treating grooves having tractive surfaces and arranged transversely to the travel of the fruit, consisting in filling the grooves with fruit, establishing a supporting tractive rotative equilibrium between the fruit in the grooves and the supporting surfaces that will rotate the fruit for treating purposes but will not move the fruit from groove to groove, applying an outside force to fruit in a groove to disturb the rotative equilibrium thus increasing the traction between the fruit and the supporting surface and causing the fruit to move to an adjacent groove.

6. The method of treating rollable fruits or the like by passing the same transversely across a series of parallel treating rolls presenting a lateral continuous supporting surface arranged to support the fruit for treatment in the valleys therebetween, which comprises the steps of delivering the fruit to the valleys between adjacent treating rolls, rotating said treating rolls in a common direction to subject the fruit to rolling contact therewith sufficient to treat the fruit, so limiting the traction between the fruit and the treating rolls that the fruit will not be advanced from valley to valley by the tractive effect alone, but may be advanced by the increased tractive effect provided by additional fruit delivered to the valleys into engagement with the fruit therein and causing the fruit to advance from valley to valley across the rolls by feeding additional fruit to the valleys into engagement with the fruit therein.

7. The method of treating rollable fruits and the like by passing the same transversely across a series of substantially cylindrical parallel treating brushes arranged to support the fruit for treatment in the valleys therebetween which comprises the steps of delivering the fruit to the valleys between adjacent brushes, rotating the brushes in a common direction to subject the fruit to brushing contact therewith sufficient to treat the fruit, so limiting the traction between the fruit and the brushes that the fruit will not be advanced from valley to valley by the tractive effect alone, but may be advanced by the increased tractive effect provided by additional fruit delivered to the valleys into engagement with the fruit therein and causing the fruit to advance from valley to valley across the brushes by feeding additional fruit to the valleys into engagement with the fruit therein.

8. In an apparatus for treating rollable fruits or the like, a series of substantially cylindrical parallel brushes of common diameter arranged to support the fruit for treatment in the valleys between adjacent brushes, and means for driving said brushes in a common direction of rotation the diameters and axial spacing of the brushes being of such proportions with respect to the speed of rotation of the brushes as to apply a tractive effect between the fruit and brushes sufficient to treat the fruit but not sufficient to cause the fruit to advance from valley to valley except when urged by the force of additional fruit fed to the valleys into engagement with the fruit therein.

9. In an apparatus for treating rollable fruits or the like, a series of parallel smooth surfaced metal treating rolls of common diameter and presenting a lateral continuous supporting surface arranged to support the fruit for treatment in the valleys between adjacent rolls, and means for driving said rolls in a common direction of rotation the diameter and axial spacing of the rolls being of such proportions with respect to the speed of rotation of the rolls as to apply a tractive effect between the fruit and the rolls sufficient to remove water from the fruit but not sufficient to cause the fruit to advance from valley to valley except when urged by the force of additional fruit fed to the valleys into engagement with the fruit therein, and means for removing water from the rolls.

10. In an apparatus for treating rollable fruits and the like, a series of substantially cylindrical parallel brushes driven in a common direction of rotation and arranged to support the fruit for treatment in the valleys between adjacent brushes, and means for driving said brushes in a common direction of rotation the diameters and axial spacing of the brushes being greater than the average diameter of the fruit and of such proportions with respect to the speed of rotation of the brushes as to apply a tractive effect between the fruit and the brushes sufficient to treat the fruit but not sufficient to cause the fruit to advance from valley to valley except when urged by the force of additional fruit fed to the valleys into engagement with the fruit therein.

11. In an apparatus for treating rollable fruits and the like, a series of parallel treating rolls having a yielding treating surface and presenting a lateral continuous supporting surface arranged to support the fruit for treatment in the valleys between adjacent rolls, and means for driving the rolls in a common direction of rotation, the diameters and axial spacing of the rolls being greater than the axial diameter of the fruit and of such proportions with respect to the speed of rotation of the rolls as to apply a tractive effect between the fruit and the rolls sufficient to treat the fruit but not sufficient to cause the fruit to advance from valley to valley except when urged by the force of additional fruit fed to the valleys into engagement with the fruit therein.

12. In an apparatus for treating rollable fruits and the like, a series of substantially cylindrical parallel brushes of equal diameters greater than the average diameter of the fruit and arranged to support the fruit for treatment in the valleys between adjacent brushes, and means for driving the brushes in a common direction of rotation at equal speeds, the diameter and axial spacing of the brushes being of such proportions with respect to the speed of rotation of the brushes as to apply a tractive effect between the fruit and the brushes sufficient to treat the fruit but not sufficient to cause the fruit to advance from valley to valley except when urged by the force of additional fruit fed to the valleys into engagement with the fruit therein.

13. In a dryer for treating rollable fruits and the like, a series of parallel treating rolls presenting a lateral continuous supporting surface, the rolls being of equal diameters greater than the average diameter of the fruit arranged to support the fruit for treatment in the valleys between adjacent rolls, means for driving the rolls in a common direction of rotation at equal speeds, the diameter and axial spacing of the rolls being of such proportions with respect to the speed of rotation of the rolls as to apply a tractive effect between the fruit and the rolls sufficient to treat the fruit but not sufficient to cause the fruit to advance from valley to valley except when urged by the force of additional fruit fed to the valleys into engagement with the fruit therein, and means for removing moisture from the fruit.

14. In an apparatus for treating fruit and the like, a series of substantially cylindrical parallel brushes arranged to support the fruit for treatment in the valleys between adjacent brushes, and means for driving said brushes in a common direction of rotation, the brushes having diameters, spacing and speed of rotation for any given average size fruit in the ratio corresponding to brushes having a diameter of 4½ inches, spaced with a ½ inch clearance, and rotated at a speed ranging between 100 and 275 R. P. M. for fruit of an average diameter of 3 inches, to apply a tractive effect between the fruit and brushes sufficient to treat the fruit but not sufficient to cause the fruit to advance from valley to valley except when urged by the force of additional fruit fed to the valleys into engagement with the fruit therein.

15. In an apparatus for treating rollable fruits and the like, a series of parallel smooth surfaced metal treating rolls presenting a lateral continuous supporting surface arranged to support the fruit for treatment in the valleys between adjacent rolls, and means for driving said rolls in a common direction of rotation, the rolls having diameters, spacing and speed of rotation for any given average size fruit in the ratio corresponding to rolls having a diameter of 4½ inches, spaced with a ¼ inch clearance, and rotated at a speed ranging between 50 to 60 R. P. M. for fruit of an average diameter of 3 inches, to apply a tractive effect between fruit and the rolls sufficient to treat the fruit but not sufficient to cause the fruit to advance from valley to valley except when urged by the force of additional fruit fed to the valleys into engagement with the fruit therein.

16. In an apparatus for treating rollable fruits and the like, a series of substantially cylindrical parallel brushes of equal diameter and spacing arranged to support the fruit for treatment in the valleys between adjacent brushes, and means for driving said brushes in a common direction of rotation the diameters and axial spacing of the brushes being of such proportions with respect to the speed of rotation of the brushes as to apply a tractive effect between the fruit and brushes sufficient to treat the fruit but not sufficient to cause the fruit to advance from valley to valley except when urged by the force of additional fruit fed to the valleys into engagement with the fruit therein, and means for feeding additional fruit to the brushes to control the rate of travel of fruit across the brushes.

17. In an apparatus for treating rollable fruits and the like, a series of parallel treating rolls having a flexible treating surface and presenting a lateral continuous supporting surface arranged to support the fruit for treatment in the valleys between adjacent rolls, and means for driving said rolls in a common direction the diameters and axial spacing of the rolls being of such proportions with respect to the speed of rotation of the rolls as to apply a tractive effect between the fruit and the rolls sufficient to treat the fruit but not sufficient to cause the fruit to advance from valley to valley except when urged by the force of additional fruit fed to the valleys into engagement with the fruit therein, and means for feeding additional fruit to the rolls to control the rate of travel of fruit across the rolls.

18. A method of advancing a rollable body across a train of rolls presenting a lateral continuous supporting surface to successive positions in which it is caused to rotate freely about its own axes by its tractive engagement with successive pairs of said rolls, said method consisting in placing said rollable body on one pair of said rolls, applying a tangential force to said body to retard its rotation about its own axis thereby combining tractive engagement of the supporting roll in advance of the body with the counter-tangential effect of said force to raise said body from its position on said pair of rolls and over the roll in advance thereof.

19. A drier for rollable bodies, comprising a drying chamber provided with an inlet and a discharge outlet, a series of equidistant rolls rotatable about fixed axes and presenting a lateral continuous supporting surface, the common diameter and relative positions of said rolls being definitely proportioned to the diameter of the rollable bodies to be dried, and means for partially supporting an additional rollable body in peripheral contact with a freely rotating body on one pair of said rolls, the roll immediately in advance of the freely rotating body being adapted by the relative arrangement and spacing of said rolls in respect to the size of said rollable bodies combined with the retarding effect of said additional rollable body to raise said freely rotating body and advance it over the roll in advance thereof.

LLOYD E. JONES.